(No Model.)

D. G. LITTLEFIELD.
OVEN FOR COOKING STOVES AND RANGES.

No. 313,874. Patented Mar. 17, 1885.

Witnesses:
S. B. Brewer
C. H. Hamlin

Inventor:
D. G. Littlefield,
by William H. Low
Attorney.

UNITED STATES PATENT OFFICE.

DENNIS G. LITTLEFIELD, OF ALBANY, NEW YORK.

OVEN FOR COOKING STOVES AND RANGES.

SPECIFICATION forming part of Letters Patent No. 313,874, dated March 17, 1885.

Application filed October 22, 1884. (No model.)

*To all whom it may concern:*

Be it known that I, DENNIS G. LITTLEFIELD, of the city and county of Albany, in the State of New York, have invented certain new and useful Improvements in Ovens for Cooking Stoves and Ranges, of which the following is a specification.

The object of my invention is to afford facilities for furnishing an oven with a constant supply of air that is sufficient to prevent the destructive drying away and wasting of the nutritive juices of meats and other articles during the process of roasting or baking, the air being drawn into the oven by means of a stimulated draft produced by an auxiliary flue leading from the oven to the smoke-pipe, and the entering currents being divided into numerous infinitesimal jets and brought into contact with heated metal, being warmed before entering the oven, and there its heat increased to a sufficient degree to accomplish the result required before escaping through the outlet-flue to the smoke-pipe and chimney provided for that purpose.

To this end my invention consists in providing the door, or, when preferred, a stationary wall of the oven, with inlet-air openings arranged near the bottom of the oven and outlet-air openings above, but separated from said inlet-air openings, as herein shown and described, the said inlet and outlet openings being provided with an internal perforated or reticulated screen, and with a grated guard so constructed and arranged that its bars will not obstruct the free ingress and egress of the air-currents, the said outlet-openings being connected to an auxiliary flue which leads into the smoke-outlet, and affords the means for carrying off the vitiated air and impure vapors from the oven.

Figure 1:
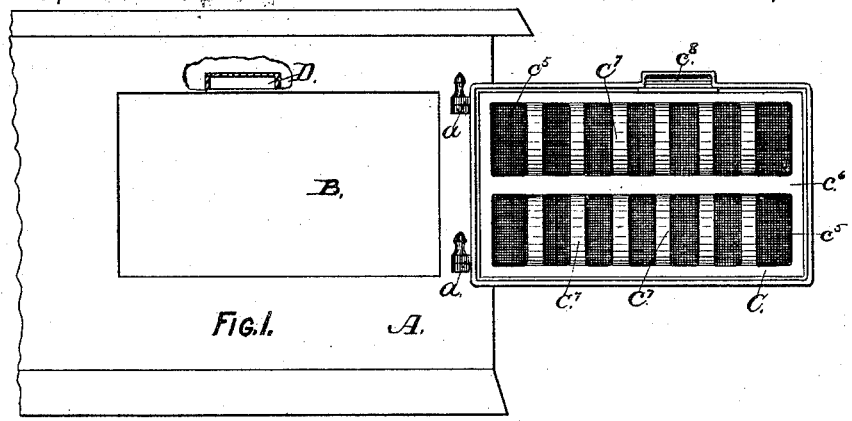
Figure 2:
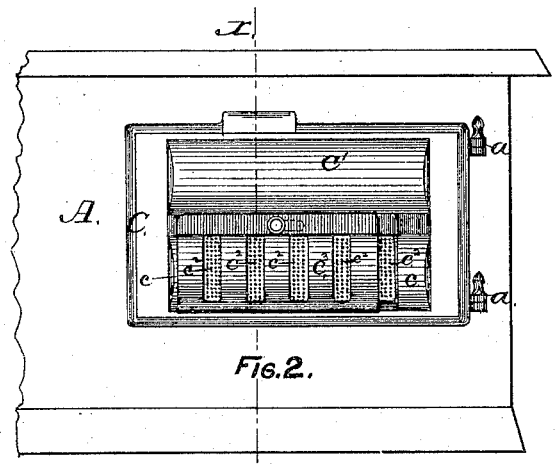
Figure 3:
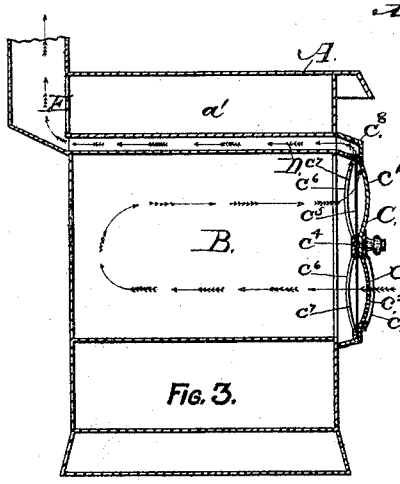
Figure 4:
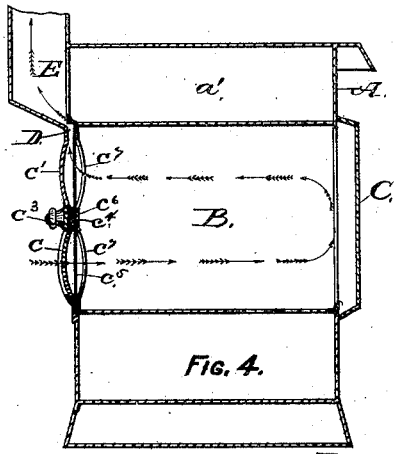

In the accompanying drawings, which are herein referred to and form part of this specification, Figure 1 is a side elevation of part of a range with my invention applied to the oven-door, said door being shown as when swung back to open the oven; Fig. 2, the same with the oven-door closed; Fig. 3, a transverse section at the line $x$ $x$ of Fig. 2, and Fig. 4 a transverse section of a range-oven with my invention attached to a stationary wall of the oven.

As represented in the drawings, A is the body of the range; B, the oven; C, the oven-door; D, the auxiliary flue, and E the smoke-outlet. The range-body A may be made of any preferred construction, and is provided with an oven, B, of the usual form. The oven-door C is hinged at $a$ to the range-body, as shown in Figs. 1, 2, and 3. The oven door is provided with a lower outwardly-projecting convex swell, $c$, and a like upper swell, $c'$, both of said swells being arranged on horizontal lines. The lower swell, $c$, contains a series of inlet-air openings, $c^2$, which are preferably supplied with finely-perforated panels for the purpose of dividing the air-currents into a great number of minute streams, which will quickly absorb warmth from their contact with the heated metal. A sliding damper or register, $c^3$, provided with openings which correspond to the inlet-air openings $c^2$, is arranged on the outer face of the swell $c$, and affords the means for excluding the admission of air through the inlet-openings $c^2$, when so required. The air-circulating chamber formed by the inner or concave side of the lower swell, $c$, is separated by means of the flat longitudinal bearings $c^4$ from the air-circulating chamber formed in the upper swell, $c'$, so that no direct vertical communication between the two air-circulating chambers can be had. A flat vertical screen, $c^5$, made of very fine wire-gauze or finely-perforated plates, covers over both chambers formed by the swells $c$ and $c'$, and the concavity of said chambers permits a free circulation of air along the entire outer surface of the screen contained in each of the chambers. The frame of the grated guard $c^6$ bears against the inner face of the screen $c^5$, so as to secure the said screen around its edges and along the bearing $c^4$. The bars $c^7$ of said guard are curved, so as to afford a free circulation of air through the screen $c^5$ over its entire area, where it covers the chambers in the swells $c$ and $c'$. A pocket, $c^8$, formed on the upper edge of the door C, forms a communication between the chamber in the upper swell, $c'$, and the auxiliary flue D, which crosses transversely over the upper side of the oven and connects with the smoke-outlet E. The flue D, by being placed in the flue $a'$ over the oven, is acted on externally by the heated currents as they pass from the fire-box toward the system of flues in the range, and thereby the flue D becomes sufficiently heated to create a stimulated draft through said flue, whereby vapors and vitiated air will be drawn from the oven, so as to make room for a constantly-entering supply of fresh air. In the modification shown in Fig. 4 the swells $c$ and $c'$ are formed on the stationary wall of the oven. The construction and arrangement of said swells and of the damper $c^3$, screen $c^5$, and guard $c^6$ are in every respect the same as above described in regard to their adaptation to Figs. 1, 2, and 3; but the flue D, instead of being arranged transversely across the top of the oven, leads directly upward into the smoke-outlet E. The air entering the oven through the inlet-air openings in the lower swell, $c$, being colder than the air that has for a time been within the oven, will, from its greater gravity, form a lower stratum, which, as it becomes heated, will circulate upward and toward the outlet-opening into the upper swell, $c'$. The direction of the circulation of air into, through, and out of the oven is approximately indicated by the arrows shown in Figs. 3 and 4, and, in addition to the advantage of obtaining a constant supply of fresh air, whereby the oven will be perfectly ventilated, it is obvious that the air in the oven, by being kept in continuous circulation, so that every atom will be brought into contact with the heated plates which form the oven, will absorb much more heat therefrom than it would while lying in a dormant condition.

The screen $c^5$, that separates the air-circulating chambers (formed by the swells $c$ and $c'$) from the oven-space, should be made of fine wire-gauze of not less than eighty meshes to the square inch, or its equivalent in finely-perforated plate, in order that the air in the lower air-circulating chamber may be retained in said chamber sufficiently long to become properly heated before it passes into the oven, and so that the air within the oven-space will not escape therefrom too rapidly into the outlet-flue.

When preferred, the damper or register $c^3$ may be dispensed with, so as to leave at all times an unobstructed way through the perforated panels of the inlet-air openings $c^2$.

I am aware that M. H. Roberts, in his Patent No. 176,063, dated April 11, 1876, shows an oven-door having two sliding registers, one at the top and the other at the bottom of said door; that such door, with its registers, is combined with an oven that is divided into two compartments by a partition-plate having a series of perforations near its inner end. The effect of this construction is to create a current of air from the room through the lower compartment and over said plate through the upper compartment of the oven, and thence on into the room in which the range or stove is situated. Such is not the purpose of my invention, in that air cannot pass from my oven to the room where the stove is situated. The absence of a stimulated flue in the Roberts invention is not important, in that the register-opening in his door permits air to enter his oven at atmospheric temperature, which is not the case with my invention. By my chambered perforated door the air is partly heated in the door, and the circulation described is caused by the flue leading from the upper perforated chamber of the door to the exit-flue and chimney.

I claim as my invention—

That improvement in the ovens of stoves, ranges, &c., which consists in providing its door or equivalent vertical plate with a lower air-circulating chamber having air-inlet openings, as herein described, and an upper air-circulating chamber having air-outlet openings, the said air-circulating chambers being formed in said door or plate in a vertical plane, one above the other, separated from each other by a horizontal partition, and separated from the oven-space by a perforated or reticulated screen, as herein set forth, the upper air-circulating chamber being connected with the smoke-outlet by means of an auxiliary flue, whereby a stimulated draft is produced, to convey the vitiated air and gases out of the oven-space, as herein specified.

DENNIS G. LITTLEFIELD.

Witnesses:
S. B. BREWER,
HENRY C. LITTLEFIELD.